United States Patent
Hsu

(10) Patent No.: US 8,165,415 B2
(45) Date of Patent: Apr. 24, 2012

(54) IMAGE PROCESSING SYSTEM HAVING SCALING AND SHARPNESS DEVICE AND METHOD THEREOF

(75) Inventor: Jeng-yun Hsu, Hsinchu (TW)

(73) Assignee: Silicon Integrated Systems Corp., Hsinchu (TW)

( * ) Notice: Subject to any disclaimer, the term of this patent is extended or adjusted under 35 U.S.C. 154(b) by 621 days.

(21) Appl. No.: 12/429,852

(22) Filed: Apr. 24, 2009

(65) Prior Publication Data

US 2010/0272376 A1    Oct. 28, 2010

(51) Int. Cl.
*G06K 9/40* (2006.01)

(52) U.S. Cl. ......... 382/269; 382/255; 382/264; 382/275

(58) Field of Classification Search .................. 382/255, 382/269, 275
See application file for complete search history.

(56) References Cited

U.S. PATENT DOCUMENTS

| | | | | |
|---|---|---|---|---|
| 5,991,463 | A * | 11/1999 | Greggain et al. | 382/298 |
| 6,219,464 | B1 * | 4/2001 | Greggain et al. | 382/298 |
| 7,362,376 | B2 * | 4/2008 | Winger et al. | 348/448 |
| 7,659,939 | B2 * | 2/2010 | Winger et al. | 348/448 |
| 8,072,540 | B2 * | 12/2011 | Hsu | 348/448 |
| 2001/0020950 | A1 * | 9/2001 | Shimizu et al. | 345/611 |
| 2005/0078884 | A1 * | 4/2005 | Yi | 382/300 |
| 2005/0134602 | A1 * | 6/2005 | Winger et al. | 345/606 |
| 2005/0163401 | A1 * | 7/2005 | Park et al. | 382/300 |
| 2008/0074538 | A1 * | 3/2008 | Chang | 348/448 |
| 2008/0232707 | A1 * | 9/2008 | Lee et al. | 382/255 |
| 2008/0247665 | A1 * | 10/2008 | Hsu | 382/274 |
| 2010/0272376 | A1 * | 10/2010 | Hsu | 382/261 |

* cited by examiner

*Primary Examiner* — Sath V Perungavoor
*Assistant Examiner* — Gandhi Thirugnanam

(57) ABSTRACT

An image processing system having scaling and sharpness device and method thereof are described. The global frequency detecting unit calculates a vertical frequency level of the input pixels along a vertical direction and a horizontal frequency level along a horizontal direction. The gradient-calculating summation unit calculates a set of gradient brightness levels according to a portion of the input pixels along a set of directions respectively. The threshold-adjusting device adjusts a first threshold and a second threshold based on the relationship of the vertical frequency level and the horizontal frequency level. The image blending device determines a cross-angle direction with the first threshold from the threshold-adjusting device and determines a minimum-angle direction with the second threshold from the threshold-adjusting device, wherein the image blending device generates the first pattern associated with the cross-angle direction and the second pattern associated with the minimum-angle direction and blends the first pattern with the second pattern based on the weighting factor value.

25 Claims, 11 Drawing Sheets

IMAGE PROCESSING SYSTEM HAVING SCALING AND SHARPNESS DEVICE AND METHOD THEREOF

FIELD OF THE INVENTION

The present invention relates to an image processing system and method thereof, and more particularly to an image processing system having scaling and sharpness device and method thereof.

BACKGROUND OF THE INVENTION

Generally, it is often desired to scale a video image to an arbitrary size. It is common practice when scaling to do so separately in the horizontal and vertical directions for the video image. However, the video image using such an approach may suffer from poor image quality, including jagged edges, commonly termed as "stairstepping".

Conventionally, a method of directional scaling interpolation is utilized to improve the video image quality by reducing stairstepping when scaling the video image. Basically, while the directional scaling interpolation is performed for the video image, the video image has a plurality of input pixels and each of the input pixels corresponds a two-dimensional window, i.e. the window size of 6 by 8 (6×8), when one of the input pixels is termed as a reference pixel. When reconstructing an enlarged video image from an original video image, it is necessary to interpolate the original input pixels therebetween for generating upsampled pixels between consecutive lines and to interpolate the original input pixels for "inserting" new pixels into the enlarged video image.

Algorithms incorporating directional interpolation techniques analyze the local gradient characteristics of the input pixels in the video image. The implement interpolation is implemented based on those local gradient characteristics along both one direction, i.e. a lowest frequency direction or a direction to the minimum local gradient level, and the other direction, i.e. a horizontal direction or a direction which is orthogonal to the lowest frequency direction, of the video image.

Moreover, the video image is composed of three-dimensional directions, including the vertical, horizontal and temporal (i.e. time-based) directions when the video image is played sequentially. However, the noises which are inherent in the temporal direction incorrectly influence the calculation of the local gradient characteristics along the lowest frequency direction and thus the determination of the other direction orthogonal to the lowest frequency direction is erroneous. Therefore, the pixel with the noises flicks in video image along at least two different temporal directions. For example, regarding to the same image region of the video image, the lowest frequency direction is determined by angle "A" at temporal direction "t", and however, the lowest frequency direction is determined by angle "B" at temporal direction "t+1", wherein the angle "B" is not equal to angle "A" disadvantageously, commonly termed as "flick" or "sparkle". While playing the video image, hence the input pixels sparkle on the same plane since the inequality in angle "B" and angle "A" results in the deviation of the lowest frequency direction.

In addition, it is common practice when making a sharpness procedure separately in the horizontal and vertical directions for the scaled input pixels. However, the scaled input pixels using such a sharpness approach may suffer from poor image quality, including jagged edges. In other words, the effect of the jagged edges on the scaled input pixels cannot be completely avoided because it is inherent in the pixels along the lowest frequency direction of the scaled input pixels when employing the conventional sharpness technique. Consequently, there is a need to develop a novel image processing system for solving the aforementioned problems.

SUMMARY OF THE INVENTION

The first objective of the present invention is to provide an image processing system having scaling and sharpness device and method thereof to solve the problem of sparkles in the video image.

The second objective of the present invention is to provide an image processing system having scaling and sharpness device and method thereof for precisely performing a sharpness procedure on the video image along the direction orthogonal to lowest frequency direction while the video image is scaled to solve the problem of jagged edges in the video image.

According to the above objectives, the present invention sets forth an image processing system having a scaling and sharpness device and method thereof. The image processing system includes a global frequency detecting unit, a gradient-calculating summation unit, a threshold-adjusting device and an image blending device. The image blending device further includes a cross-angle determination module, a minimum-angle determination module, a weight-evaluating unit, a first scaling/sharpness module, a second scaling/sharpness module, a noise filter, and a blending unit.

The global frequency detecting unit detects the frequency of a plurality of input pixels to calculate a vertical frequency level of the input pixels along a vertical direction and a horizontal frequency level along a horizontal direction when one of the input pixels is assigned to be a reference pixel for forming a two-dimensional window. The gradient-calculating summation unit calculates a set of gradient brightness levels according to a portion of the input pixels along a set of directions, respectively. The threshold-adjusting device adjusts a first threshold and a second threshold based on the relationship of the vertical frequency level and the horizontal frequency level from the global frequency detecting unit. Firstly, the image blending device determines the cross-angle direction with the first threshold from the threshold-adjusting device and determines the minimum-angle direction with the second threshold from the threshold-adjusting device. Then, the image blending device generates the first pattern associated with the cross-angle direction and the second pattern associated with the minimum-angle direction and blends the first pattern with the second pattern based on the weighting factor value.

The global frequency detecting unit globally and coarsely calculates the vertical frequency level along the vertical direction and the horizontal frequency level along the horizontal direction of the total input pixels. That is, the vertical and horizontal frequency levels associated with the first threshold and the second threshold are globally calculated according to the sums of the absolute differences of the brightness levels of the total input pixels within the two-dimensional window along the vertical direction and the horizontal direction. During the calculations of the vertical and horizontal frequency levels, each of the input pixels is assigned to be a reference pixel for forming a two-dimensional window, e.g. the window size of 6 by 8.

When the weighting factor value is increased, the interpolation result represents that the input pixels approach the minimum-angle direction. When the weighting factor value is decreased, the interpolation result represents that the input pixels approach the cross-angle direction. While the video image is played, the weighting factor value is dynamically adjusted to increase or decrease the weighting factor value so that the interpolation results along the minimum-angle direction and the cross-angle direction are dynamically modified. The sparkles which affect the interpolation results along the minimum-angle due to the noise are filtered away from the video image.

The method comprising the steps of:

(a) The global frequency detecting unit and the gradient-calculating summation unit receives input pixels, respectively.

(b) The global frequency detecting unit calculates a vertical frequency level along a vertical direction and a horizontal frequency level along a horizontal direction.

(c) The threshold-adjusting device adjusts a first threshold and a second threshold based on the vertical frequency level and the horizontal frequency level.

(d) The gradient-calculating summation unit calculates a set of gradient brightness levels of a portion of the input pixels along a set of directions, respectively.

(e) The cross-angle determination module compares the brightness gradient levels to determine that a cross-angle direction is along either the horizontal or vertical direction for generating a first pattern using the first threshold.

(f) The minimum-angle determination module compares the brightness gradient levels to determine that a minimum-angle direction is along one of the set of directions for generating a second pattern using the second threshold.

(g) The image blending device blends the first pattern associated with the first threshold from the global frequency detecting unit with the second pattern associated with the second threshold from the gradient-calculating summation unit based on a weighting factor value.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
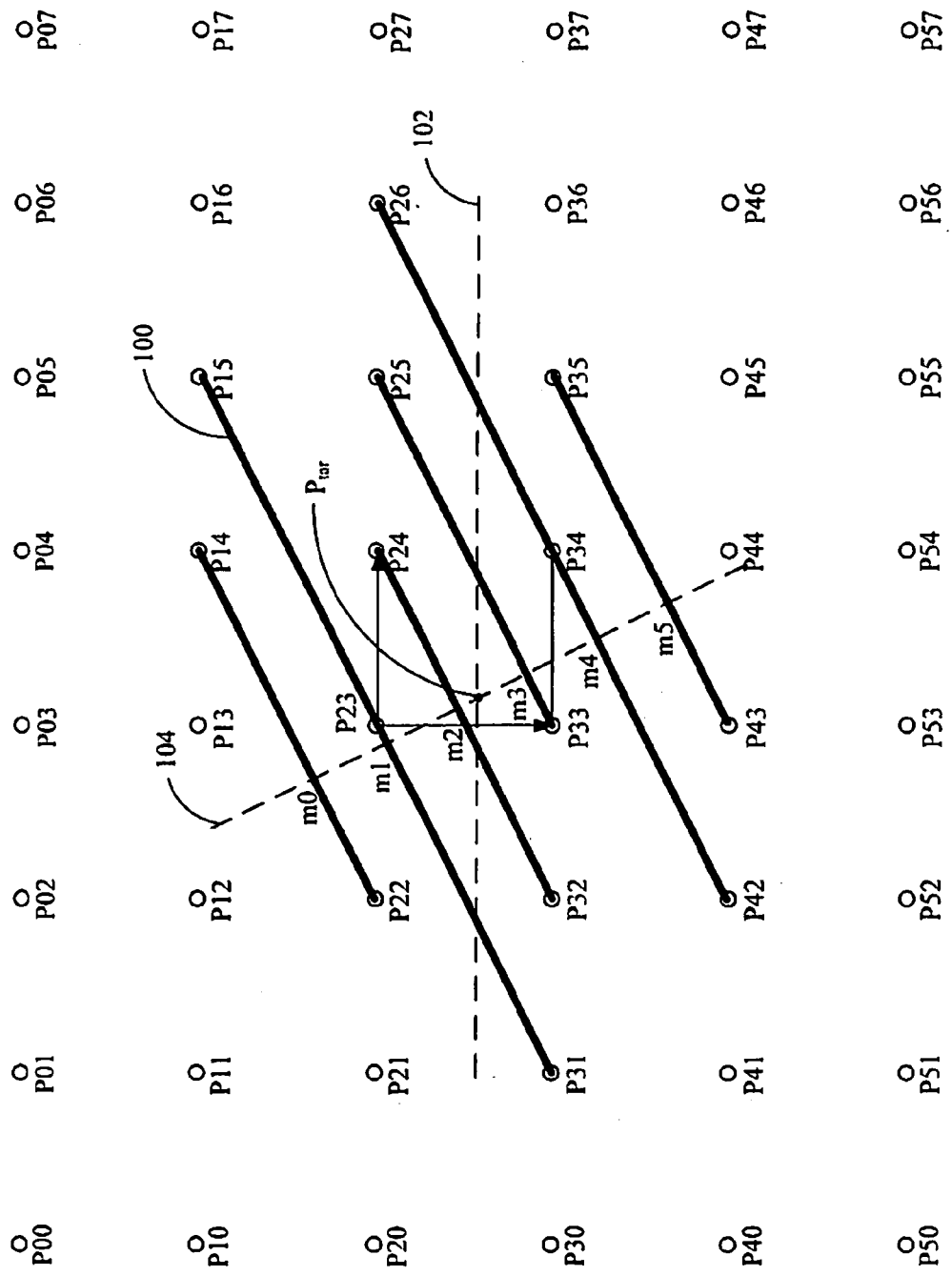
FIG. 1 is a schematic view of a plurality of input pixels in a video image while an image processing system employs a directional scaling mechanism along the minimum-angle and cross-angle directions according to one embodiment of the present invention.

FIG. 1 is a schematic view of a plurality of input pixels in a video image while employing a directional scaling mechanism along the minimum-angle and cross-angle directions (100, 102) according to one embodiment of the present invention. FIG. 1 shows a target output pixel $P_{tar}$. The four center input pixels, i.e. P23, P24, P33, and P34, that are most closely associated with pixel $P_{tar}$ coordinate-wise form a rectangular region encompassing the pixel $P_{tar}$. The brightness level of pixel $P_{tar}$ is computed by the brightness levels of the pixels along a minimum-angle direction 100 and a cross-angle direction, e.g. horizontal direction 102 or vertical direction, in the input pixels, as shown in FIG. 1. In this case, the dimensional level of the video image has the window size of 6×8 and the cross-angle direction is along the horizontal direction 102. It should be noted that the window size of the input pixels may be arbitrary dimensional level.

The input pixels of the video image are identified as shown in FIG. 1 by their coordinate locations relative to the pixel, i.e. pixel P00, in the upper left corner of the window. The coordinate of the target output pixel $P_{tar}$ is given in terms of the pixel's coordinate location relative to the pixel, i.e. pixel P23 which is termed a reference pixel, in the upper left corner of the center region. Generally, the target output pixel $P_{tar}$ shown in FIG. 1 has non-integer coordinate.

Based on the directional interpolation algorithm of the directional scaling mechanism in the present invention, the final interpolation result is briefly represented as following formula (E1):

final interpolation result of the target output pixel
$P_{tar}$=(intp_min)*(weighting factor value)+(intp_cross)*(1−weighting factor value)    (E1)

wherein "intp_min" is the interpolation result along the minimum-angle direction and "intp_cross" is the interpolation result along the cross-angle direction. It should be noted that the cross-angle direction is either a vertical direction or a horizontal direction and the minimum-angle direction is a minimum-angle direction of the directional angles except the cross-angle direction. The minimum-angle direction and cross-angle direction of the video image are selected from a plurality of gradient directions which are determined by computing the brightness levels of the input pixels along the various directional angles, as shown in FIG. 2A.

Figure 2A:
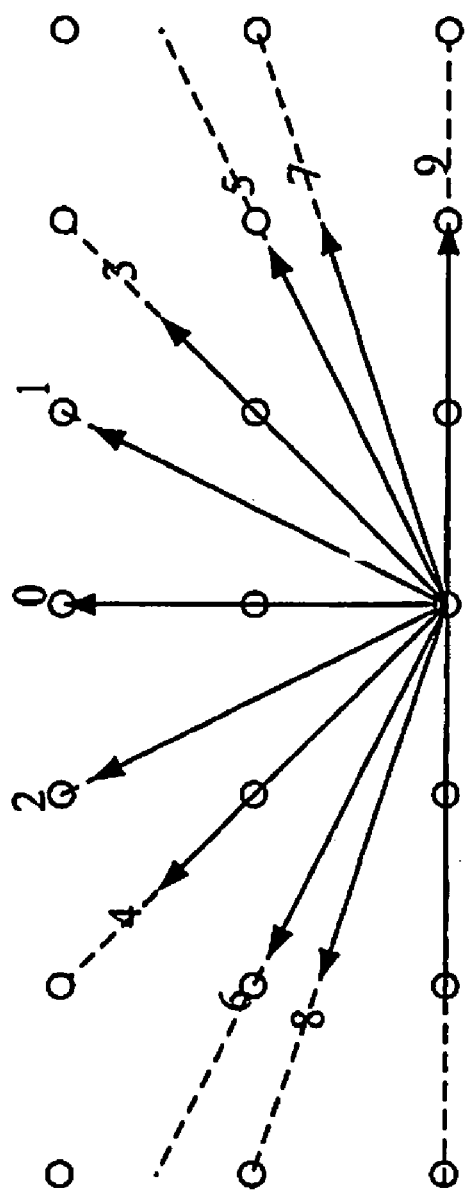
FIG. 2A is a schematic view of a plurality of gradient directions associated with the input pixels for determining the minimum-angle and cross-angle directions while the image processing system scales the video image according to one embodiment of the present invention.
Figure 2B:
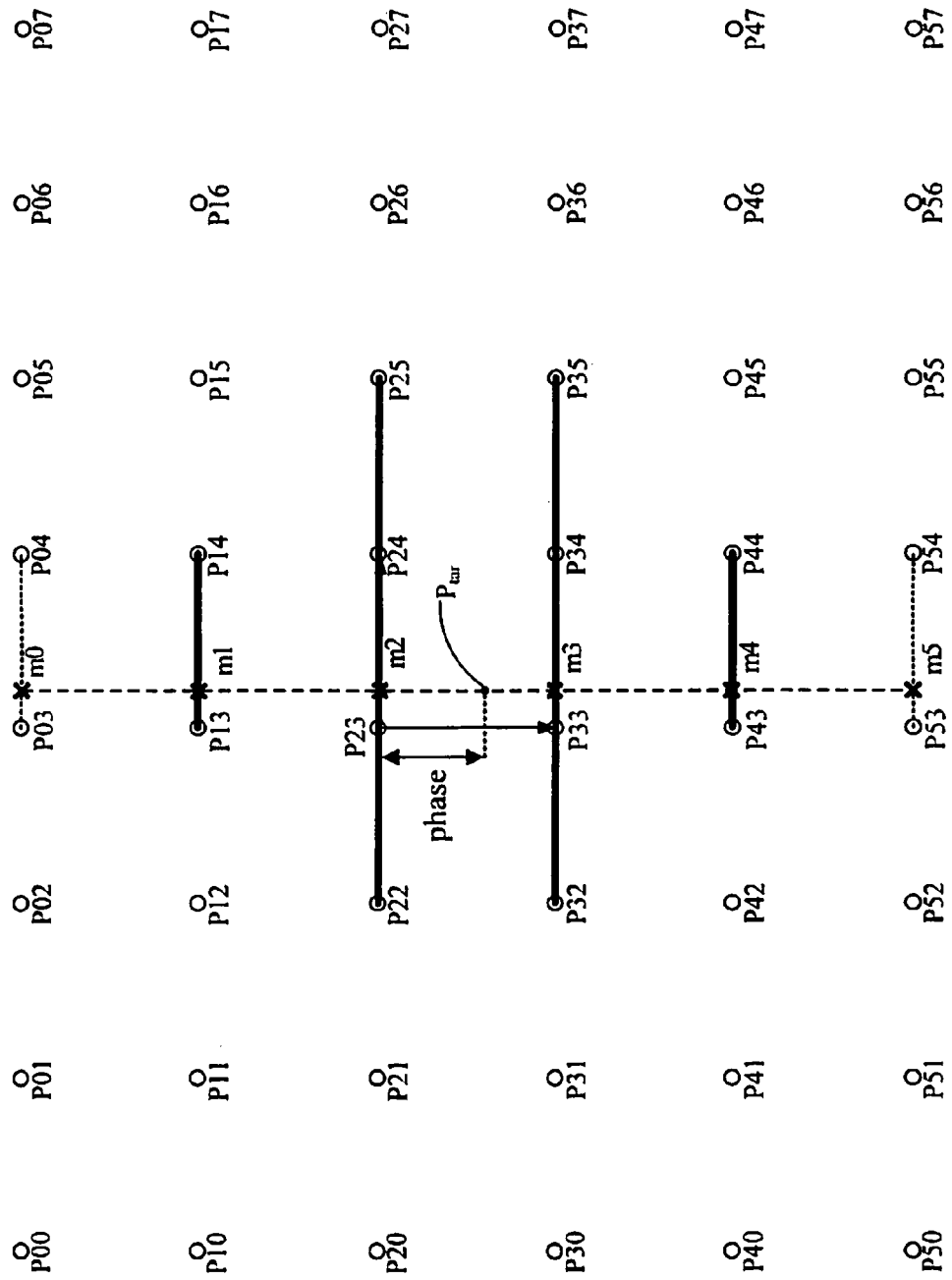
FIGS. 2B-2G are schematic views for calculating the sums of the absolute values of the brightness difference between the various pairs of input pixels along a variety of gradient directions correspondingly according to one embodiment of the present invention.
Figure 2C:
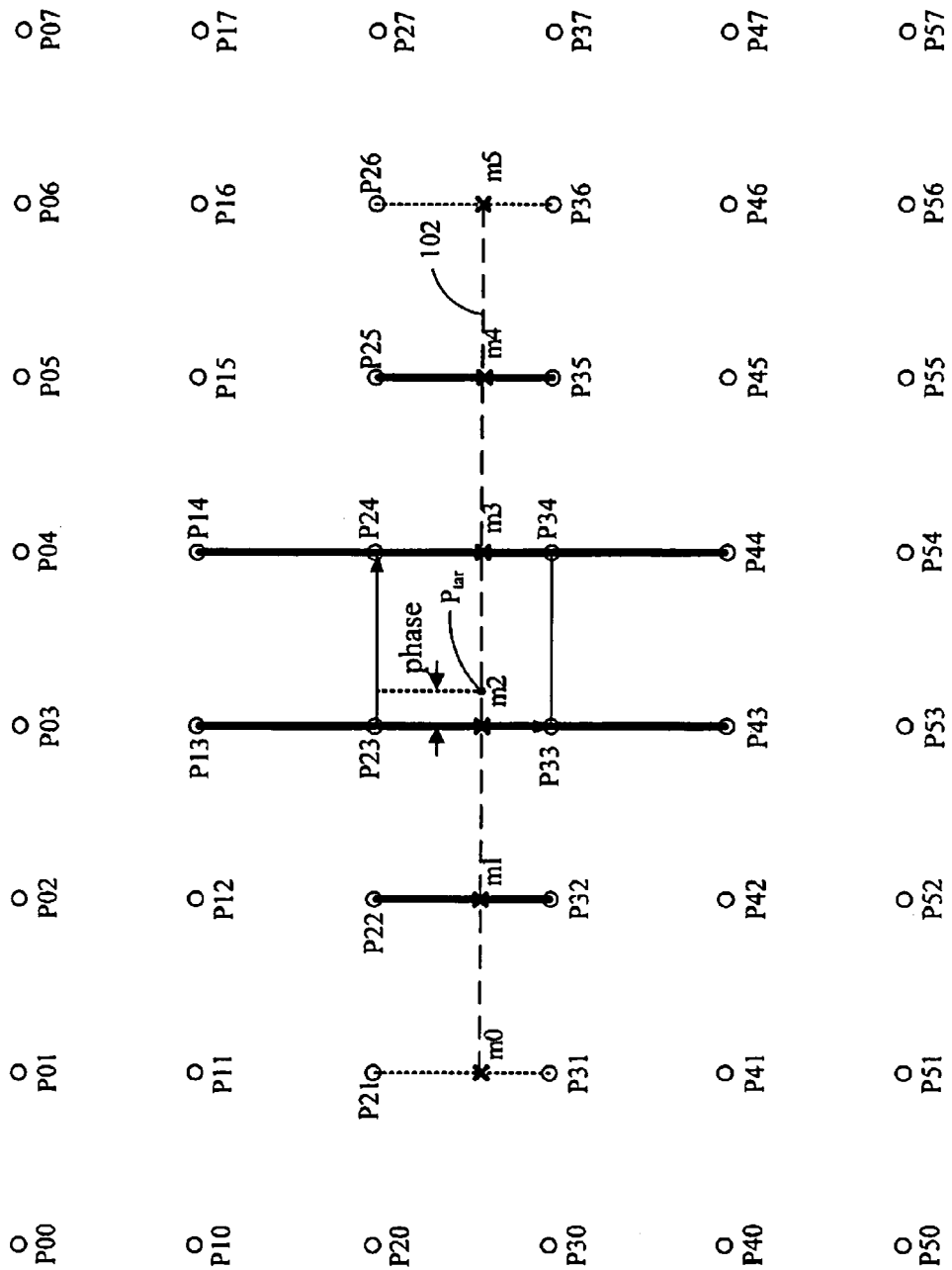
Figure 2D:
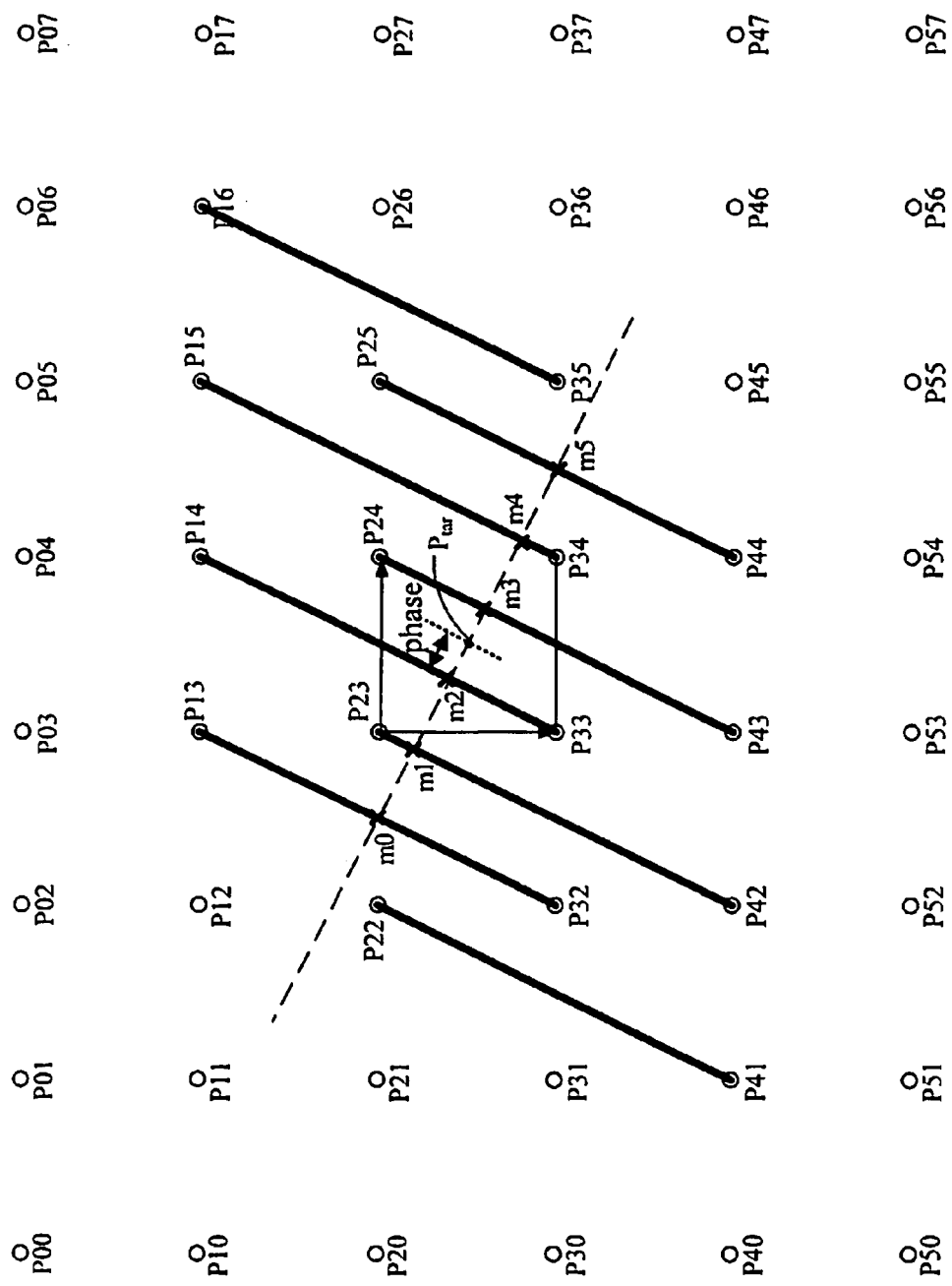
Figure 2E:
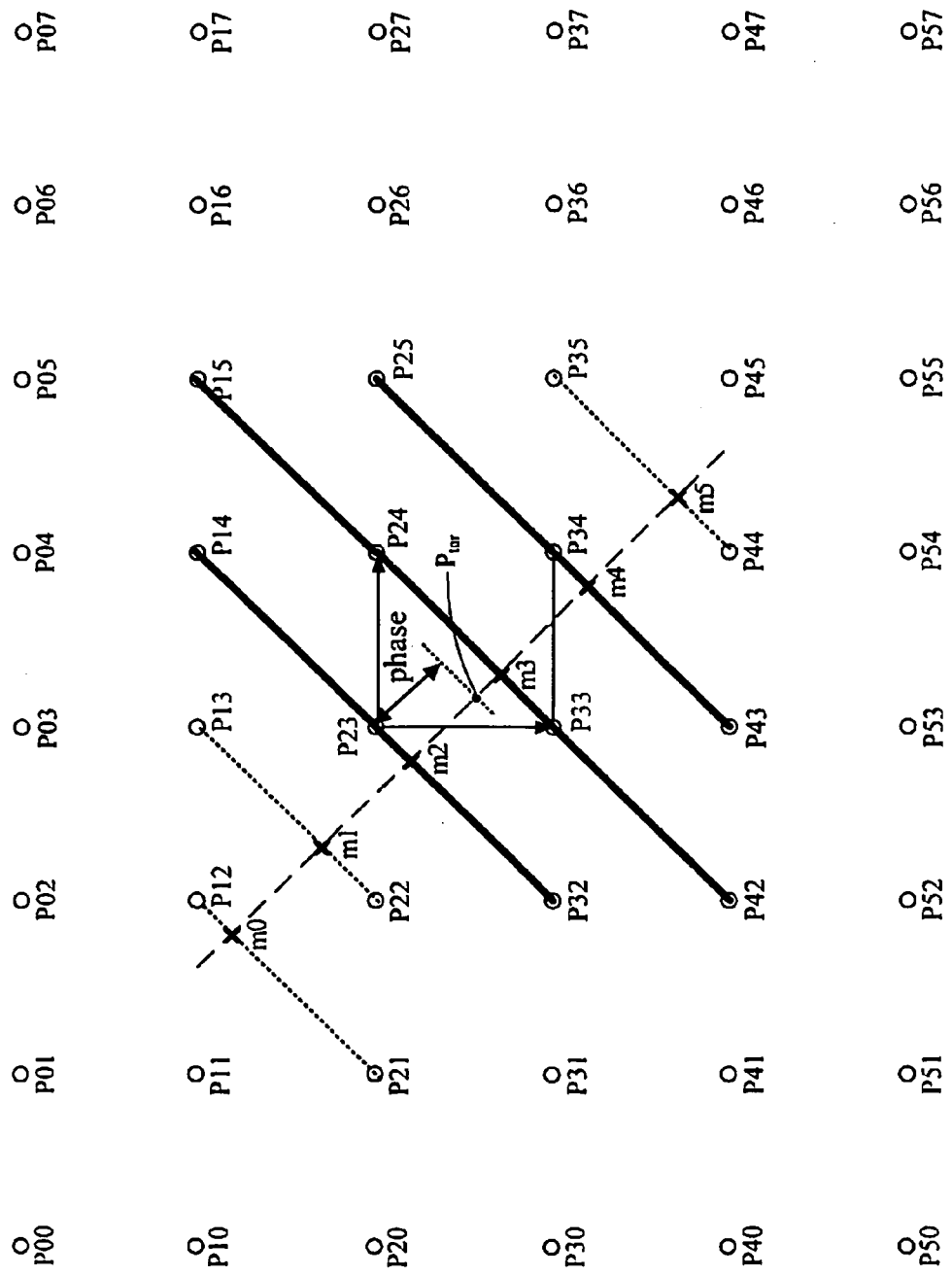
Figure 2F:
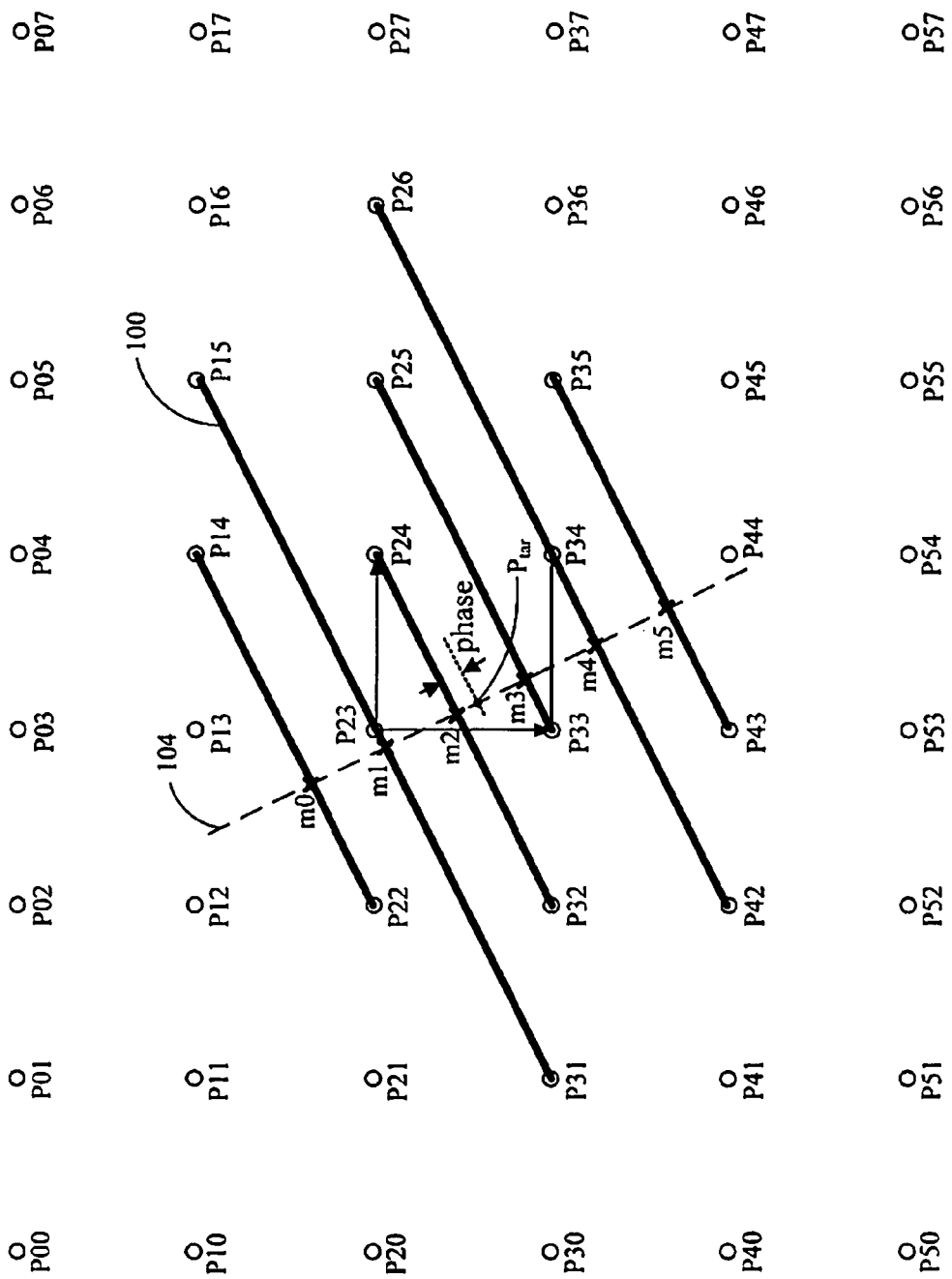

In one case of the minimum-angle direction 100 in FIGS. 1 and 2F, the interpolation result "intp_min" is determined by the interpolation of intermediate points m0 through m5 which can be deemed as virtual pixels on the minimum-angle direction. A connection line 104 of the intermediate points passes the target output pixel $P_{tar}$ and is perpendicular to the direction of the lowest frequency, i.e. minimum-angle direction 100. The intermediate points m0 through m5 are determined by the interpolation of pixels, e.g. P22, P14, P31, P23, P15, P32, P24, P33, P25, P42, P34, P26, P43, and P35, along the minimum-angle direction. Similarly, in one case of the cross-angle direction in FIGS. 1 and 2C, the interpolation result "intp_cross" is determined by the interpolation of intermediate points m0 through m5 which can be deemed as virtual pixels on the cross-angle direction. A connection line of the intermediate points passes the target output pixel $P_{tar}$ and is perpendicular to the direction of the lowest frequency, i.e.

cross-angle direction 102, as shown in FIG. 2C. The intermediate points m0 through m5 are determined by the interpolation of pixels, e.g. P31, P21, P32, P22, P43, P33, P23, P13, P44, P34, P24, P14, P35, P25, P36, and P26, along the cross-angle direction. Therefore, the target output pixel $P_{tar}$ is determined by "intp_min" and "intp_cross".

FIG. 2A is a schematic view of a plurality of gradient directions associated with the input pixels for determining the minimum-angle and cross-angle directions while the image processing system scales the video image according to one embodiment of the present invention. In the present invention, the sums of the absolute differences of the brightness gradient levels between the various pairs of input pixels in the video image are calculated for determining the brightness gradient levels along several gradient directions. The minimum-angle and cross-angle directions are selected from these gradient directions, respectively. In one case, these gradient directions can be indicated as directions "0" through "9". It should be noted that the amount of the gradient directions can be more or less than ten directions "0" through "9" by the various arrangement of the input pixels in the window.

In one embodiment, the gradient level along the minimum-angle direction is the minimum brightness change and the minimum gradient level is selected from a set of the brightness gradient levels which are computed along four directions "1", "3", "5", and "7" at the right plane, and other four directions "2", "4", "6", and "8" at the left plane. Person skilled in the art should be noted that the minimum brightness change can be selected from more than eight directions which depend on the arrangement of input pixels in the video image. The gradient level along the cross-angle direction is selected from one of the brightness gradient levels which are computed along the cross-angle directions, including the vertical direction "0" and the horizontal direction "9".

FIGS. 2B-2G are schematic views for calculating the sums of the absolute values of the brightness difference between the various pairs of input pixels along a variety of gradient directions correspondingly according to one embodiment of the present invention.

As shown in FIG. 2B, the sums of the absolute differences of the brightness gradient levels along the direction "0" (vertical) is calculated by following formula (E2):

$$S0=|P14-P13|+|P23-P22|+|P24-P23|+|P25-P24|+ \\ |P33-P32|+|P34-P33|+|P35-P34|+|P44-P43| \quad (E2)$$

As shown in FIG. 2C, the sums of the absolute differences of the brightness gradient levels along the direction "9" (horizontal) is calculated by following formula (E3):

$$S9=|P32-P22|+|P43-P33|+|P33-P23|+|P23-P13|+ \\ |P44-P34|+|P34-P24|+|P24-P14|+|P35-P25| \quad (E3)$$

As shown in FIG. 2D, the sums of the absolute differences of the brightness gradient levels along the direction "1" is calculated by following formula (E4):

$$S1=|P32-P13|+|P42-P23|+|P33-P14|+|P43-P24|+ \\ |P34-P15|+|P44-P25| \quad (E4)$$

As shown in FIG. 2E, the sums of the absolute differences of the brightness gradient levels along the direction "3" is calculated by following formula (E5):

$$S3=|P32-P23|+|P23-P14|+|P42-P33|+|P33-P24|+ \\ |P24-P15|+|P43-P34|+|P34-P25| \quad (E5)$$

As shown in FIG. 2F, the sums of the absolute differences of the brightness gradient levels along the direction "5" is calculated by following formula (E6):

$$S5=|P22-P14|+|P31-P23|+|P23-P15|+|P32-P24|+ \\ |P33-P25|+|P42-P34|+|P34-P26|+|P43-P35| \quad (E6)$$

Figure 2G:
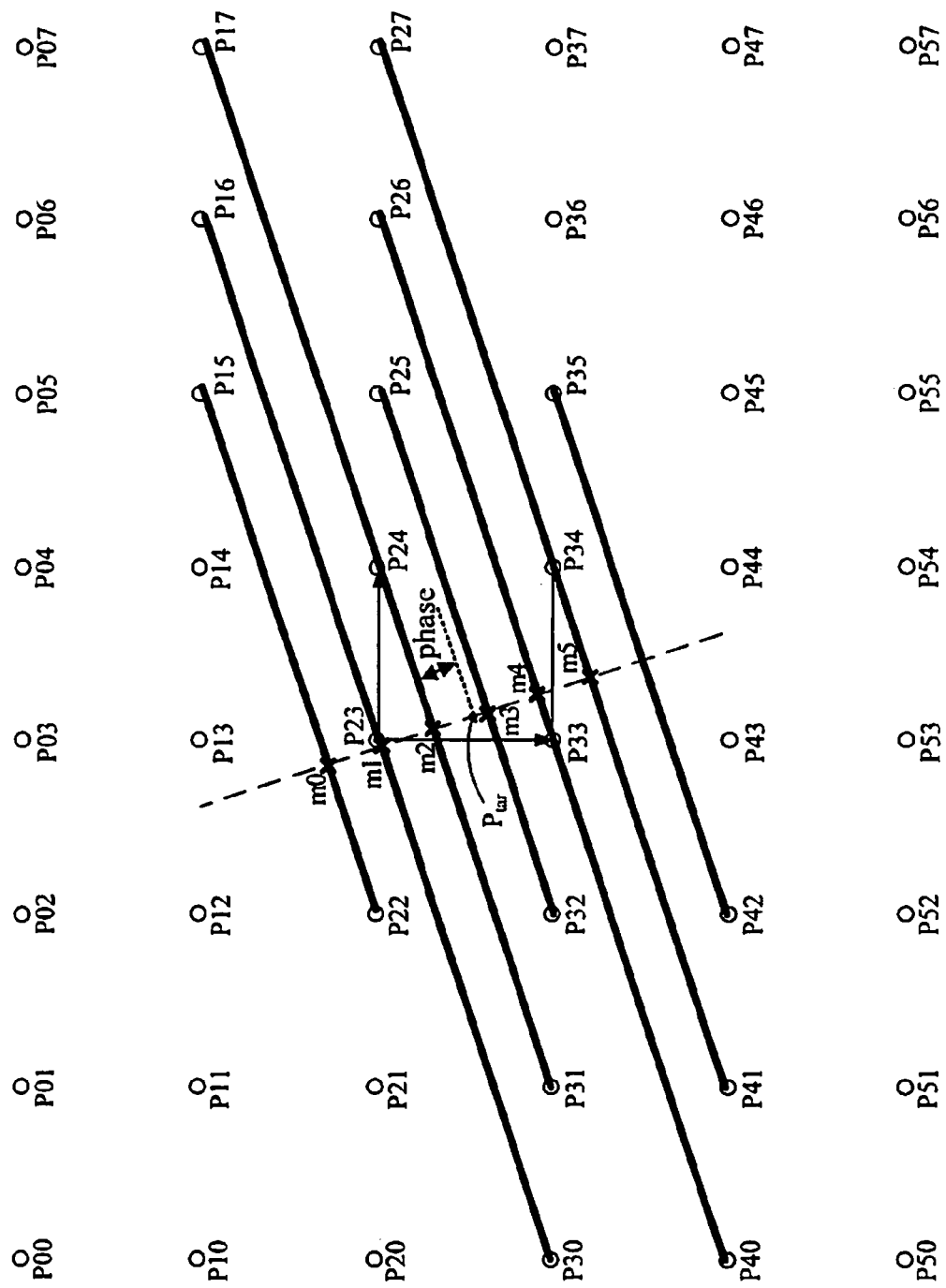

As shown in FIG. 2G, the sums of the absolute differences of the brightness gradient levels along the direction "7" is calculated by following formula (E7):

$$S7=|P22-P15|+|P30-P23|+|P23-P16|+|P31-P24|+ \\ |P24-P17|+|P32-P25|+|P40-P33|+|P33-P26|+ \\ |P41-P34|+|P34-P27| \quad (E7)$$

Since the directions "2", "4", "6" and "8" are symmetrical to the directions "1", "3", "5", and "7" respectively shown in FIG. 2A, therefore, the sums, i.e. S2, S4, S6, and S8, of the absolute differences of the brightness gradient levels along the directions "2", "4", "6" and "8" can be calculated by the above formulas E4 through E7, which are represented by S1, S3, S5, and S7. Based on the calculated sums of the absolute differences of the brightness gradient levels, the gradient level along the minimum-angle direction is the minimum brightness change by selecting the minimum value among the sums of S1, S2, S3, S4, S5, S6, S7, and S8, respectively, as described in the above formulas E4 through E7. Similarly, the gradient level along the cross-angle direction is the minimum brightness change by selecting the minimum value among the sums of S0 and S9, as described in the above formulas E2 and E3.

Figure 3:
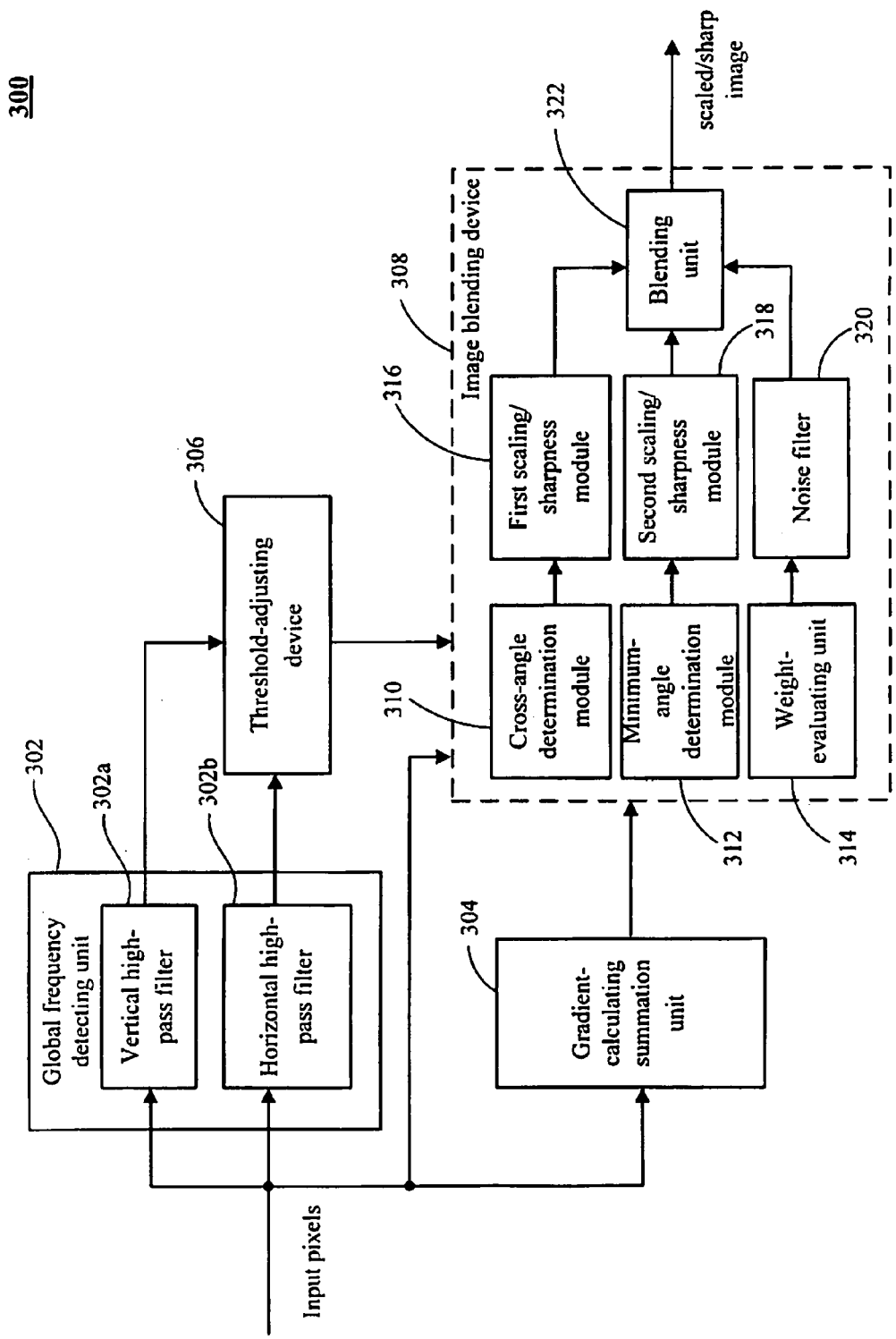
FIG. 3 is a schematic block diagram of the image processing system according to one embodiment of the present invention.

FIG. 3 is a schematic block diagram of the image processing system 300 according to one embodiment of the present invention. The image processing system 300 includes a global frequency detecting unit 302, a gradient-calculating summation unit 304, a threshold-adjusting device 306, and an image blending device 308. The global frequency detecting unit 302 is coupled to the threshold-adjusting device 306. The gradient-calculating summation unit 304 is coupled to the image blending device 308. The threshold-adjusting device 306 is coupled to the image blending device 308.

The image blending device 308 further includes a cross-angle determination module 310, a minimum-angle determination module 312, a weight-evaluating unit 314, a first scaling/sharpness module 316, a second scaling/sharpness module 318, a noise filter 320, and a blending unit 322. The gradient-calculating summation unit 304 is coupled to the cross-angle determination module 310, the minimum-angle determination module 312, and the weight-evaluating unit 314, respectively. The first scaling/sharpness module 316 couples the cross-angle determination module 310 to the blending unit 322. The second scaling/sharpness module 318 couples the minimum-angle determination module 312 to the blending unit 322. The noise filter 320 couples the weight-evaluating unit 314 to the blending unit 322.

The global frequency detecting unit 302 detects the frequency of a plurality of input pixels to calculate a vertical frequency level of the input pixels along a vertical direction and a horizontal frequency level along a horizontal direction when one of the input pixels is assigned to be a reference pixel for forming a two-dimensional window. The gradient-calculating summation unit 304 calculates a set of gradient brightness levels according to a portion of the input pixels along a set of directions, such as directions "0" through "9" in FIG. 2A, respectively. The threshold-adjusting device 306 adjusts a first threshold and a second threshold based on the relationship of the vertical frequency level and the horizontal frequency level from the global frequency detecting unit 302. Firstly, the image blending device 308 determines the cross-angle direction with the first threshold from the threshold-adjusting device 306 and determines the minimum-angle direction with the second threshold from the threshold-adjusting device 306. Then, the image blending device 308 generates the first pattern associated with the cross-angle direction and the second pattern associated with the minimum-angle direction and blends the first pattern with the second pattern based on the weighting factor value. In the present invention, the first threshold is the value which is stored in the register of threshold-adjusting device 306 and associated with the cross-angle determination module 310 to be adjusted, and the second threshold is the value which is stored in the register of threshold-adjusting device 306 and associated with the minimum-angle determination module 312 to be adjusted.

The global frequency detecting unit 302 globally and coarsely calculates the vertical frequency level along the vertical direction and the horizontal frequency level along the horizontal direction of the total input pixels. That is, the vertical and horizontal frequency levels associated with the first threshold and the second threshold are globally calculated according to the sums of the absolute differences of the brightness levels of the total input pixels within the two-dimensional window along the vertical direction and the horizontal direction. During the calculations of the vertical and horizontal frequency levels, each of the input pixels is assigned to be a reference pixel for forming a two-dimensional window, e.g. the window size of 6 by 8.

The first scaling/sharpness module 316 implements a directional scaling and sharpness step based on one of the vertical direction and the horizontal direction. The second scaling/sharpness module 318 implements the directional scaling and sharpness step based on one of the minimum-angle direction except the vertical direction and the horizontal direction.

Please continuously refer to FIG. 1 and the above formula (E1). When the weighting factor value is increased, the interpolation result represents that the input pixels approach the minimum-angle direction. When the weighting factor value is decreased, the interpolation result represents that the input pixels approach the cross-angle direction. While the video image is played, the weighting factor value is dynamically adjusted to increase or decrease the weighting factor value so that the interpolation results along the minimum-angle direction and the cross-angle direction are dynamically modified. The sparkles which affect the interpolation results along the minimum-angle due to the noise are filtered away from the video image.

Please refer to FIGS. 1 and 3. The global frequency detecting unit 302 further includes a vertical frequency detecting unit 302a and a horizontal frequency detecting unit 302b. The vertical frequency detecting unit 302a computes the vertical frequency level associated with the input pixels along the vertical direction. The horizontal frequency detecting unit 302b computes the horizontal frequency level associated with the input pixels along the horizontal direction. The horizontal frequency level "hsum (n, m)" may be represented as the following formula (E8) and the vertical frequency level "vsum (n, m)" may be represented as following formula (E9).

$$hsum(n, m) = \sum_{i=0}^{5}\sum_{j=1}^{6} \min(abs(P_{n+i,m+j}*2 - P_{n+i,m+j-1} - P_{n+i,m+j+1}),$$
reg_hedge_th1) (E8)

$$vsum(n, m) = \sum_{i=1}^{4}\sum_{j=0}^{7} \min(abs(P_{i+n,m+j}*2 - P_{n+i-1,m+j} - P_{n+i+1m+j}),$$
reg_hedge_th1) (E9)

where "n" and "m" are reference pixel indexes at row and column corresponding to one of the input pixels in the two-dimensional window, respectively, "i" is row index relative to the pixel index "n" of a reference pixel, "j" is column index relative to the pixel index "m" of a reference pixel, and "reg_hedge_th1" is a frequency threshold. The sign of "min" means the minimum one of the sums and the sign of "abs" means the sums of the absolute differences of the brightness levels. According to formulas (E8) and (E9), each of the input pixels is regarded as a reference pixel, which corresponds the two-dimensional window, e.g. the window size of 6×8, so that the vertical frequency level along the vertical direction and the horizontal frequency level along the horizontal direction can be generated by the formulas (E8) and (E9) respectively.

The threshold-adjusting device 306 controls the cross-angle determination module 310 and the minimum-angle determination module 312 by adjusting the first threshold and the second threshold according to the relationship between "hsum" and "vsum" so that the cross-angle determination module 310 and the minimum-angle determination module 312 are capable of precisely determining the cross-angle direction and the minimum-angle direction, respectively. These control cases for the cross-angle determination module 310 are described as follows.

In one case, when the horizontal frequency level is greater than the vertical frequency level, the cross-angle direction associated with the input pixels tends to the vertical direction. In another case, when the vertical frequency level is greater than the horizontal frequency level, the cross-angle direction associated with the input pixels tends to the horizontal direction. The minimum-angle direction is a direction of a minimum brightness change associated with the input pixels. In one embodiment, the vertical frequency detecting unit 302a is a high-pass filter, and the horizontal frequency detecting unit 302b is a high-pass filter. Specifically, the threshold-adjusting device 306 determines five cases about the relationship between the values of horizontal frequency level "hsum (n, m)" and vertical frequency level "vsum (n, m)".

In the first case, if "hsum" is greater than a maximum horizontal threshold and "vsum" is less than a minimum vertical threshold, the cross-angle direction associated with the input pixels globally tends to the vertical direction which is in a low frequency. The cross factor (dscale_sad_cross_factor) is given by the cross factor register in the threshold-adjusting device 306, and when the cross factor is a smaller value, the cross alpha (i.e. the weighting factor value along the cross-angle direction) is decreased. The cross sums of the absolute difference (SAD) threshold (dscale_sad_cross_th) is given by the cross SAD register in the threshold-adjusting device 306, and when the cross SAD threshold is a larger value, the cross alpha is decreased.

In the second case, if "vsum" is greater than a maximum vertical threshold and "hsum" is less than a minimum horizontal threshold, the cross-angle direction associated with the input pixels tends to the horizontal direction which is in a low frequency. The cross factor (dscale_sad_cross_factor) is given by the cross factor register in the threshold-adjusting device 306, and when the cross factor is a larger value, the cross alpha is increased. The cross sums of the absolute difference (SAD) threshold (dscale_sad_cross_th) is given by the cross SAD register in the threshold-adjusting device 306, and when the cross SAD threshold is a smaller value, the cross alpha is increased.

In the third case, if "vsum" is greater than the maximum vertical threshold and "hsum" is greater than the maximum horizontal threshold, the input pixels are termed "check board". In such a situation, the horizontal direction or the vertical direction is not a low frequency direction. The cross factor (dscale_sad_cross_factor) is given by the cross factor register in the threshold-adjusting device 306, and when the cross factor is a larger or smaller value, the cross alpha is increased or decreased. The cross SAD threshold (dscale_sad_cross_th) is given by the cross SAD register in the threshold-adjusting device 306, and when the cross SAD threshold is a smaller or larger value, the cross alpha is increased or decreased.

In the fourth case, if "vsum" value is greater than the times of "hsum" value and "vsum" value isn't larger than the maximum vertical threshold and "hsum" value isn't less than the minimum horizontal threshold, the cross-angle direction associated with the input pixels tends to the horizontal direction which is in a low frequency direction relative to the vertical direction. In the fifth case, the cross-angle direction associated with the input pixels tends to a default direction, i.e. the vertical direction.

Based on the above cases, even some pixels in the video image affected by inherent noises, the noise cannot change the global gradient of the input pixels in view of the cross-angle direction since the cross-angle direction is correctly either the horizontal direction or the vertical direction based on the global "hsum" and "vsum" values respectively.

Please refer to FIGS. 2A and 3 continuously. The cross-angle determination module 310 determines the first pattern along one of the vertical direction and the horizontal direction based on the first threshold. The minimum-angle determination module 312 determines the second pattern along one of the set of directions based on the second threshold except the vertical direction and the horizontal direction.

In the cross-angle determination module 310, cross alpha, cross angle, and cross SAD can be determined by a section of program as follows:

```
if (sad[i][j][9] + dscale_sad_cross_th) <= sad[i][j][0])
    cross_alpha = (sad[i][j][0] − sad[i][j][9] −
dscale_sad_cross_th) / (sad[i][j][9] + 1) *
dscale_sad_cross_factor + 1; ......(E10)
    else
        cross_alpha = 0;
    if (cross_alpha >= reg_dscale_cross_alpha_th)
        cross_angle = 9;
    else
        cross_angle = 0;
    if(sad->sad[i][j][9] < sad->sad[i][j][0])
        cross_sad = sad->sad[i][j][0];
    else
        corss_sad = sad->sad[i][j][9];
```

According to the above section of program, if the sum of SAD along the direction "9" (sad[i][j][9]) and the cross SAD threshold (dscale_sad_cross_th) is less than or equal to SAD along the direction "0" (sad[i][j][0]), cross alpha can be computed by formula E10. Then, the cross alpha value (cross_alpha) along the direction "9" is generated; otherwise, the cross alpha value along the direction "0" is generated. The cross factor (dscale_sad_cross_factor) is determined by the threshold-adjusting device 306. If the cross alpha value is greater than or equal to cross alpha threshold (reg_dscale_cross_alpha_th), the cross angle is along the direction "9"; otherwise, the cross angle (cross_angle) is along the direction "0". If the SAD along the direction "9" is less than the SAD along the direction "0", then the cross SAD (cross_sad) is the SAD along the direction "0"; otherwise, the cross SAD is the SAD along the direction "9". Therefore, the cross-angle determination module 310 can determine the cross alpha, cross angle, and cross SAD along the cross-angle direction.

As shown in FIG. 2A, the window, briefly represented by the size of 3×7, with directions "0" through "9" is divided into two planes in view of the vertical direction "0". The minimum-angle determination module 312 determines the minimum-angle direction based on four directions "1", "3", "5", and "7" at the right plane, and on four directions "2", "4", "6", and "8" at the left plane, as shown in FIG. 2A. The minimum-angle determination module 312 determines the smallest SAD (min_sad_r) and its corresponding direction index (min_angle_r), and determines the second smallest SAD (min_sad_r_2nd) and its corresponding direction index (min_angle_r_2nd) from the four directions "1", "3", "5", and "7" at the right plane. Similarly, the minimum-angle determination module 312 determines the smallest SAD (min_sad_l) and its corresponding direction index (min_angle_l_2nd), and also determines the second smallest SAD (min_sad_l_2nd) and its corresponding direction index (min_angle_l_2nd) from the four directions "2", "4", "6", and "8" at the left plane. In addition, the minimum-angle determination module 312 computes the total sum of SAD (sumsad_r) of the input pixels at the four directions "1", "3", "5", and "7" at the right plane, and computes the total sum of SAD (sumsad_l) of the input pixels along the four directions "2", "4", "6", and "8" at the left plane.

The minimum-angle determination module 312 compares the min_sad_r and min_sad_l to select the smallest SAD value and corresponding direction index to be the minimum SAD value (min_sad_lr) and minimum-angle direction (min_angle). In one embodiment, the minimum-angle determination module 312 further determines the second smallest SAD and its corresponding direction index from min_sad_l, min_sad_l_2nd, min_sad_r and min_sad_r_2nd. The minimum-angle determination module 312 auxiliarily ensures that the directions of min_angle and min_angle_2nd are rightly neighbor to determine whether the minimum SAD value and minimum-angle direction are "minimum" after the minimum SAD value and minimum-angle direction are found.

Basically, while the minimum-angle determination module 312 selects the smallest SAD value and corresponding direction index as the minimum SAD value and minimum-angle direction between the right and left planes, several criteria can be used for the selection:

$D1$=abs(min_sad_$l$−min_sad_$r$)>$d$scale_$lr$_th1;

$D2$=abs(min_sad_$l$−min_sad_$r$)>$d$scale_$lr$_th2;

$D3$=(min_sad_$l$>min_sad_$r$)?min_sad_$l$>=min_sad_$r$*$d$scale_$lr$_ratio1:

min_sad_$r$>=min_sad_$l$*$d$scale_$lr$_ratio1;

$D4$=(min_sad_$l$>min_sad_$r$)?min_sad_$l$>=min_sad_$r$*$d$scale_$lr$_ratio2:

min_sad_$r$>=min_sad_$l$*$d$scale_$lr$_ratio2;

$D5$=(min_sad_$l$>min_sad_$r$)?sumsad_$l$>=sumsad_$r$*$d$scale_$lr$_ratio3;

sumsad_$r$>=sumsad_$l$*$d$scale_$lr$_ratio3;

($d$scale_$lr$_th1>$d$scale_$lr$_th2; $d$scale_$lr$_ratio1>$d$scale_$lr$_ratio2)

where operator "?" in criterion D3 means that if (min_sad_l>min_sad_r), the result is (min_sad_l>=min_sad_r*dscale_lr_ratio1); otherwise the result is (min_sad_r>=min_sad_l*dscale_lr_ratio1). Similarly, operators "?" in D4, D5 and the rest of the present invention have the same meaning.

If ways D1 and D3 are satisfied, the difference between min_sad_l and min_sad_r is strong enough to determine the smaller SAD and minimum-angle direction. However, in many cases the difference isn't strong enough but meets a rudimentary requirement (D2 and D4). In these situations, the other criterion D5 is introduced to help the decision. The criterion D5 implicates if the minimum-angle direction tend to right or left direction and the corresponding sum of SADs of the minimum-angle side should be much smaller than the other side. If the difference between min_sad_l and min_sad_r meets D1 and D3 simultaneously, or D2, D4 and D5 simultaneously, the smaller SAD between min_sad_l and min_sad_r and the corresponding angle direction are the found minimum SAD values and minimum-angle direction; otherwise, the minimum SAD values is set to an absolutely maximum value and the minimum-angle direction is ignored.

In one embodiment, the threshold of selection criteria from D1 to D5 for determining minimum SAD value and minimum-angle direction are dynamically changed by the threshold-adjusting device 306 based on the result of the global frequency detection unit 302. In the first, second and third cases of fives cases computed by the global frequency detecting unit 302, as described in the above, the threshold adjusting device 306 tends to adjust the thresholds in D1 to D5 to larger values and let the selection of minimum-angle determination module 312 more restricted. Global gradient direction of 6×8 windows tend to vertical or horizontal in first and second case; and too much high frequency components exist in both horizontal and vertical direction in the third case. It's safe to adjust the threshold to restricted one in order to avoid the erroneous minimum-angle direction determination for these three cases.

The weight-evaluating unit 304 calculates a weighting factor value of the minimum-angle direction. The weight-evaluating unit 304 evaluates four factors to determine the weighting factor value. The weighting factor value is the sum of the first, second, third, and fourth factors. These factors are described as follows.

The first factor is determined by the SAD values along the cross-angle direction and minimum-angle direction. The first factor can be represented as following formula (E11):

factor1=(min_sad_cross−min_sad_$lr$−reg_$d$scale_sad_margin)/min_sad_$lr$*reg_$d$scale_sad_factor1;   (E11)

where "reg_dscale_sad_margin" and "reg_dscale_sad_factor1" are determined by the threshold-adjusting device 306. The first factor is proportional to the difference between SAD values along the cross-angle direction and minimum-angle direction. Meanwhile, the direction tends to the minimum-angle direction and the weighting factor value is enlarged while the first factor is increased.

The second factor is determined by the total sums of the SAD value at the left and right planes. The second factor can be represented as following formula (E12):

(E12)
If (min_angle_lr == 1 || min_angle_lr == 3 || mi_angle_lr == 5 || min_angle_lr == 7) //min_angle_lr is right direction
    factor2 = (sum_sad_l − sum_sad_r *
reg_dscale_sad_factor_2) / (sum_sad_r + 1);
    else // min_angle_lr_is left direction
    factor 2 = (sum_sad_r − sum_sad_l *
reg_dscale_sad_factor_2) / (sum_sad_l + 1);

When the value of factor2 is positive, it represents the min_angle_lr is the same left or right direction as the direction decided from the comparison between sumsad_l and sumsad_r. Otherwise, the value of factor2 is negative. The higher second factor represents that the found direction correctly tends to the minimum-angle direction.

The third factor is associated with the minimum SAD value along the minimum-angle direction. The third factor can be represented as following formula (E13):

factor3=(min_sad_$lr$−reg_$d$scale_sad_max)*reg_$d$scale_sad_factor3;   (E13)

where "reg_dscale_sad_max" and "reg_dscale_sad_factor3" are determined by the threshold-adjusting device 306. If the third factor is increased, the weighting factor value is decreased.

The fourth factor is used to identify whether the minimum SAD value along the minimum-angle direction has secondary smallest SAD value relative to the minimum SAD value. The fourth factor can be represented as following section of program:

if( min_angle_lr == 1 || min_angle_lr == 3 || min_angle_lr == 5 || min_angle_lr == 7) // min_angle_lr is right direction
    if (abs(min_angle_lr − min_angle_r_2nd) == 2) //is rightly neighbor?
        factor4 = (min_sad_cross >= (min_sad_lr +
        reg_dscale_sad_margin)) ?
            reg_dscale_sad_factor4_1 : 0;
    else
        factor4 = −reg_dscale_sad_factor4_2;
else // min_angle_lr is left direction
    if (abs(min_angle_lr − min_angle_l_2nd) == 2) //is rightly neighbor
        factor4 = (min_sad_cross >= (min_sad_lr +
        reg_dscale_sad_margin)) ?
            reg_dscale_sad_factor4_1 : 0;
    else
        factor4 = −reg_dscale_sad_factor4_2;

where "reg_dscale_sad_factor4_1" and "reg_dscale_sad_factor4_2" are determined by the threshold-adjusting device 306.

Please refer to FIG. 2F. FIG. 2F is a detailed schematic view of determining the gradient level along the minimum-angle direction shown in FIG. 2 according to one embodiment of the present invention. The scaler filter can be represented by following formula: $f_{scaler}$ (phase)=[a0 a1 a2 a3] where a0, a1, a2 and a3 are coefficients of windowed-sinc filter at certain phase, for example.

The sharpness filter can be represented by following formula: $f_{sharp}$ (gain)=[−1 2 −1]*gain+[0 1 0]=[s0 s1 s2] where the gain is the sharpness enhance degree and [−1 2 −1] is a typical sharpness filter.

Thus, combining the windowed-sinc filter and certain sharpness gain, the new coefficients can be generated by $f_{sharp\_scaler}$ (phase, gain)=convolution ($f_{scale}$ (phase, $f_{sharp}$ (gain))=convolution ([a0 a1 a2 a3], [s0, s1, s2])=[a0', a1', a2', a3', a4', a5]; and intp_min=interpolation ($f_{sharp\_scaler}$ (phase, gain), m0, m1, m2, m3, m4, m5)=a0'*m0+a1'*m1+a2'*m2+a3'*m3+a4'*m4+a5'*m5, where the sharp gain is associated with the difference of maximum value and minimum value among m1 through m4. It should be noted that the intermediate points of m0, m1, m2, m3, m4, and m5 are associated with the position of the target output pixel $P_{tar}$. The intermediate points "m0" through "m5" can be deemed as virtual pixels which intersect lines of the lowest frequency to the line through the target output pixel $P_{tar}$ perpendicular to the direction of the lowest frequency.

Specifically, in one case of the minimum-angle direction 100 in FIG. 2F, the interpolation result "intp_min" is determined by the interpolation of intermediate points m0 through m5. A connection line 104 of the intermediate points passes the target output pixel $P_{tar}$ and is perpendicular to the direction of the lowest frequency, i.e. minimum-angle direction 100. The intermediate points m0 through m5 are determined by the interpolation of pixels. In one embodiment, m0 through m5 can be represented as following formula:

$m0=P14*d0+P22*(1-d0)$; $d0=\text{distance}(m0, P14)/\text{distance}(P22, P14)$;

$m1=P23*d1+P31*(1-d1)$; $d1=\text{distance}(m1, P23)/\text{distance}(P31, P23)$;

$m2=P24*d2+P32*(1-d2)$; $d2=\text{distance}(m2, P24)/\text{distance}(P32, P24)$;

$m3=P25*d3+P33*(1-d3)$; $d3=\text{distance}(m3, P25)/\text{distance}(P33, P25)$;

$m4=P34*d4+P42*(1-d4)$; $d4=\text{distance}(m4, P34)/\text{distance}(P42, P34)$; and $m5=P35*d5+P43*(1-d5)$; $d5=\text{distance}(m5, P35)/\text{distance}(P43, P35)$.

where d0 through d5 represent distance ratios. For example, the distance ratio d0 is equal to the ratio between the distance of (m0, P14) and the distance (P22, P14). Similarly, d1 through d5 can be computed by distance ratio of the corresponding pixels and intermediate points. Therefore, the interpolation "intp_min" of scaler and sharpness filter can be determined. It should be noted that m0 through m5 can be similarly computed by above formula if different directions in FIG. 2B to FIG. 2G besides FIGS. 2C and 2G are determined.

To reduce the jaggy effect caused by traditional sharpness filter, the image processing in the present invention combines the one-dimension sharpness filter into directional scaler, wherein only the one-dimension sharpness filter is applied to the orthogonal direction to cross-angle/minimum-angle.

The blending unit 322 blends a cross-angle pattern and a minimum-angle pattern based on the weighting factor value.

According to the above-mentioned descriptions, the image processing system having scaling and sharpness device solves the problems of the jagged edges and sparkles in the video image. Moreover, the image processing system having scaling and sharpness device precisely and simultaneously performs a sharpness procedure on the input pixels while the input pixels is scaled along the direction perpendicular to lowest frequency direction.

In FIG. 2F, the interpolation result along the minimum-angle direction is represented as "intp_min", wherein intp_min=interpolation ($f_{sharp\_scaler}$(Phase$_{min}$, Gain$_{min}$), m0, m1, m2, m3, m4, m5). The function "$f_{sharp\_scaler}$" outputs the coefficients corresponding to the certain scaling phase "PHASE$_{min}$" and sharpness gain "GAIN$_{min}$" of minimum-angle direction. That is, "intp_min" can be get by weighting sum with respect to intermediate points "m0", "m1", "m2", "m3", "m4", and "m5", and sharpness gain "GAIN$_{min}$" and the phase PHASE$_{min}$ from target output pixel $P_{tar}$ to any one of these intermediate points in the input pixels.

FIG. 2C is a detailed schematic view of determining the gradient level along the cross-angle direction shown in FIG. 2 according to one embodiment of the present invention. The interpolation result along the minimum-angle direction is represented as "intp_cross", wherein intp_cross=interpolation ($f_{sharp\_scaler}$ (PHASE$_{cross}$, GAIN$_{cross}$), c0, c1, c2, c3, c4, c5). The function "$f_{sharp\_scaler}$" outputs the coefficients corresponding to the certain scaling phase "PHASE$_{cross}$" and sharpness gain "GAIN$_{cross}$". That is, "intp_cross" can be get by calculating the weighting sum with respect to intermediate points "c0", "c1", "c2", "c3", "c4", and "c5", and sharpness gain "GAIN$_{cross}$" and the phase "PHASE$_{cross}$" from target output pixel $P_{tar}$ to any one of these intermediate points in the input pixels.

Figure 4:
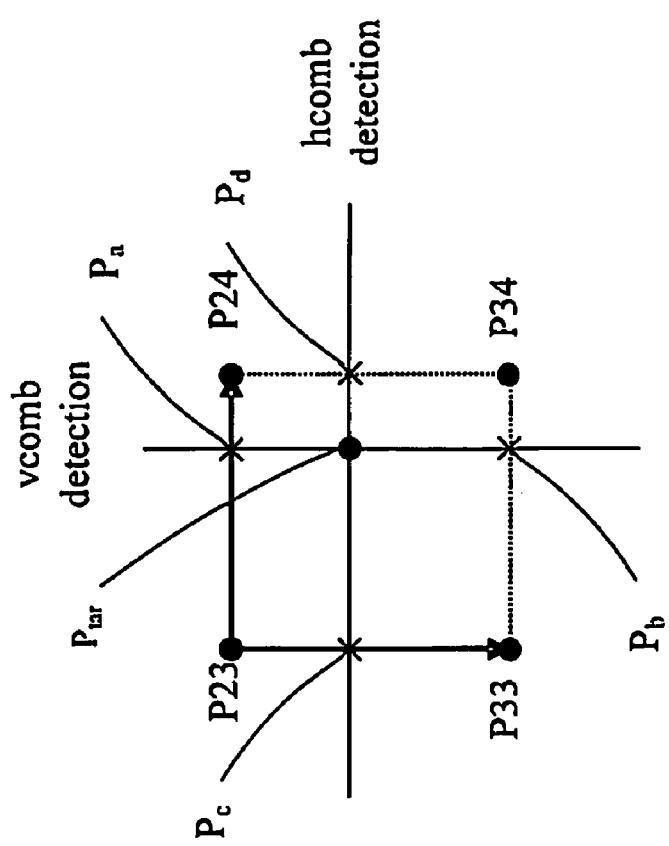
FIG. 4 is a schematic view of four input pixels that are associated with pixel $P_{tar}$ forming a rectangular region encompassing the pixel $P_{tar}$ according to one embodiment of the present invention.

The noise filter 320 of the image blending device 308 is used to detect whether that the minimum-angle direction is correct. If the minimum-angle direction may be incorrect, the noise filter 320 is capable of modifying the result of the weighting factor value. Specifically, a comb factor is subtracted from the weighting factor value to decrease the amount of the weighting factor value. Please refer to FIG. 4. FIG. 4 is a schematic view of four input pixels that are associated with pixel $P_{tar}$ forming a rectangular region encompassing the pixel $P_{tar}$ according to one embodiment of the present invention.

If the comb factor is increased, the brightness level of the pixel $P_{tar}$ is deviated from the pixels P23, P24, P33, and P34 and such a situation represents that the minimum-angle direction may be incorrect and the interpolation result tends to the cross-angle direction. The interpolation result of $P_{tar}$ is blended by values along cross-angle and minimum angle directions. The four intermediate pixels pa (up_y), pb (dn_y), pc (lf_y), and pd (rt_y) are generated by interpolating pixels P23, P24, P33, and P34, where Pa and Pb are for vertical detection, and Pc and Pd are for horizontal detection.

Please refer to FIG. 2F, where p[2] and p[3] are corresponding to "m2" and "m3", and coordinates of $P_{tar}$ (tmp_y) is represented as (row_fract, col_fract).

```
tmp_y = p[2] * (1−phase) + p[3];
up_y = P23 * (1− col_fract) + P24 * col_fract;
dn_y = P33 * (1− col_fract) + P34 * col_fract;
lf_y = P23 * (1 − row_fract) + P33 * row_fract;
rt_y = P24 * (1− row_fract) + P34 * row_fract;
vcomb = ((up_y − tmp_y − reg_dscale_comb_margin1) > 0
&& (tmp_y − dn_y + reg_dscale_comb_margin1) < 0 || (up_y −
tmp_y + reg_dscale_comb_margin1) < 0 && (tmp_y − dn_y −
reg_dscale_comb_margin1) > 0 ) ? abs(tmp_y * 2 − up_y − dn_y) −
abs(up_y − dn_y) * 0.5 : 0;
    hcomb = ((lf_y − tmp_y − reg_dscale_comb_margin1) > 0
&& (tmp_y − rt_y + reg_dscale_comb_margin1) < 0 || (lf_y −
tmp_y + reg_dscale_comb_margin1) < 0 && (tmp_y − rt_y −
reg_dscale_comb_margin1) > 0 ) ? abs(tmp_y * 2 − lf_y − rt_y) −
abs(lf_y − rt_y) * 0.5 : 0;
    if(reg_dscale_comb_filter_mth == 0)
        comb = 0;
    else if(reg_dscale_comb_filter_mth == 1) {
        if(crossangle == 0) // 90 degree
            comb = vcomb;
        else //180 degree
            comb = hcomb;
    alpha = alpha − comb_alpha;
``` where "reg_dscale_comb_margin1" and "reg_dscale_comb_filter_mth" are determined by the threshold-adjusting device 306.

Figure 5:
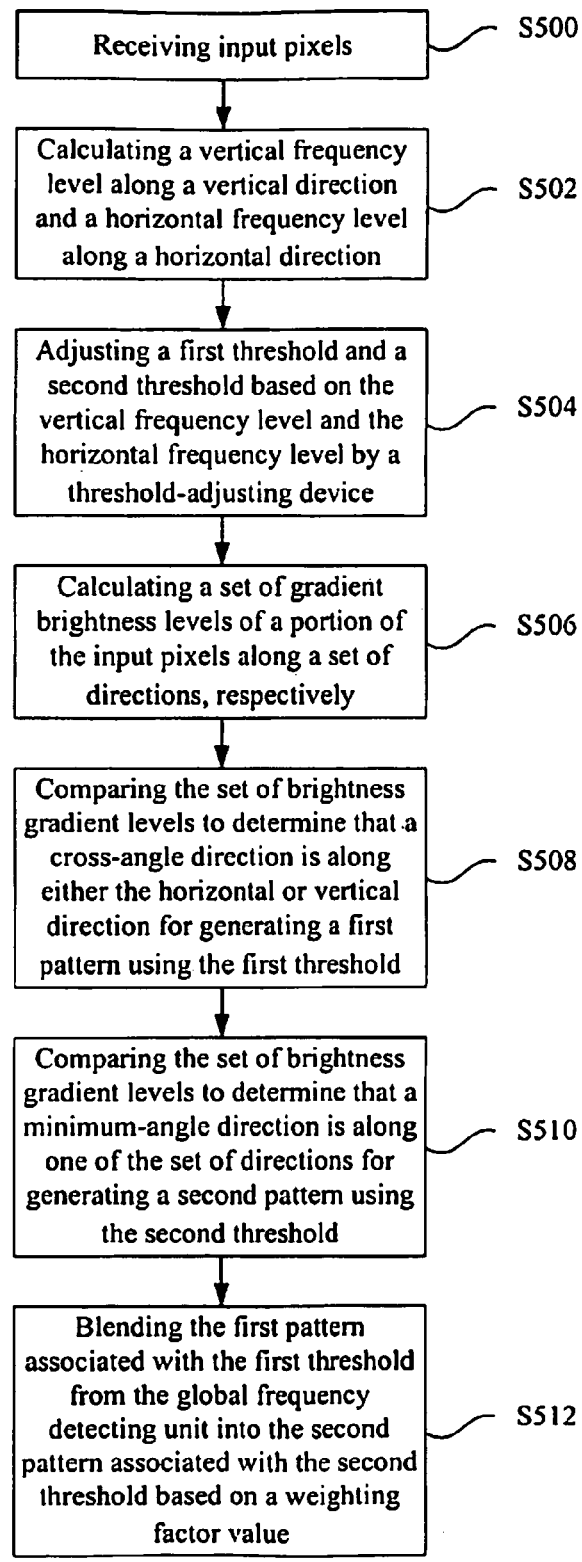
FIG. 5 is a flow chart of image processing method for implementing the image processing system according to one embodiment of the present invention.

Please refer to FIG. 3 and FIG. 5. FIG. 5 is a flow chart of image processing method for implementing the image processing system 300 according to one embodiment of the present invention. The image processing system 300 includes a global frequency detecting unit 302, a gradient-calculating summation unit 304, a threshold-adjusting device 306 and an image blending device 308. The image blending device 308 further includes a cross-angle determination module 310, a minimum-angle determination module 312, a weight-evaluating unit 314, a first scaling/sharpness module 316, a second scaling/sharpness module 318, a noise filter 320, and a blending unit 322. The global frequency detecting unit 302 further includes a vertical frequency detecting unit 302a and a horizontal frequency detecting unit 302b. The method for implementing the image processing system 300 includes the following steps of:

In step S500, the global frequency detecting unit 302 and the gradient-calculating summation unit 304 receives input pixels, respectively.

In step S502, the global frequency detecting unit 302 calculates a vertical frequency level along a vertical direction and a horizontal frequency level along a horizontal direction. During the step S502, the vertical frequency detecting unit 302a further computes the vertical frequency level along the vertical direction. The horizontal frequency detecting unit 302b computes the horizontal frequency level along the horizontal direction.

In step S504, the threshold-adjusting device 306 adjusts a first threshold and a second threshold based on the vertical frequency level and the horizontal frequency level.

In step S506, the gradient-calculating summation unit 304 calculates a set of gradient brightness levels of a portion of the input pixels along a set of directions, respectively.

In step S508, the cross-angle determination module 310 compares the brightness gradient levels to determine that a cross-angle direction is along either the horizontal or vertical direction for generating a first pattern using the first threshold.

In step S510, the minimum-angle determination module 312 compares the brightness gradient levels to determine that a minimum-angle direction is along one of the set of directions for generating a second pattern using the second threshold.

In step S512, the image blending device 308 blends the first pattern associated with the first threshold from the global frequency detecting unit 302 with the second pattern associated with the second threshold from the gradient-calculating summation unit 304 based on a weighting factor value.

During the step S512, the cross-angle determination module 310 further determines the first pattern along one of the vertical direction and the horizontal direction based on the first threshold. The minimum-angle determination module 312 further determines the second pattern along one of the set of directions based on the second threshold except the vertical direction and the horizontal direction.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. An image processing system, comprising:
   a global frequency detecting unit, for detecting frequency of a plurality of input pixels to calculate a vertical frequency level of the input pixels along a vertical direction and a horizontal frequency level of the input pixels along a horizontal direction;
   a gradient-calculating summation unit, for calculating a set of gradient brightness levels according to a portion of the input pixels along a set of directions respectively;
   a threshold-adjusting device coupled to the global frequency detecting unit, for adjusting a first threshold and a second threshold based on the relationship of the vertical frequency level and the horizontal frequency level; and
   an image blending device coupled to the gradient-calculating summation unit, for determining a cross-angle direction with the first threshold from the threshold-adjusting device and for determining a minimum-angle direction with the second threshold from the threshold-adjusting device, wherein the image blending device generates the first pattern associated with the cross-angle direction and the second pattern associated with the minimum-angle direction and blends the first pattern with the second pattern based on the weighting factor value.

2. The system of claim 1, wherein the global frequency detecting unit further comprises:
   a vertical frequency detecting unit, for computing the vertical frequency level of the input pixels along the vertical direction; and
   a horizontal frequency detecting unit, for computing the horizontal frequency level of the input pixels along the horizontal direction.

3. The system of claim 2, wherein the minimum-angle direction is a direction of a minimum brightness change associated with the input pixels.

4. The system of claim 2, wherein the vertical frequency detecting unit is a high-pass filter and the horizontal frequency detecting unit is a high-pass filter.

5. The system of claim 1, wherein the image blending device further comprises:
   a cross-angle determination module, for determining the first pattern along one of the vertical direction and the horizontal direction based on the first threshold; and
   a minimum-angle determination module, for determining the second pattern along one of the set of directions based on the second threshold except the vertical direction and the horizontal direction.

6. The system of claim 5, wherein the image blending device further comprises a weight-evaluating unit, for calculating the weighting factor value of the minimum-angle direction.

7. The system of claim 6, wherein the weighting factor value of the weight-evaluating unit is associated with a first factor which is determined by the sum of the absolute difference (SAD) of the input pixels along the cross-angle direction and minimum-angle direction respectively.

8. The system of claim 6, wherein the weighting factor value of the weight-evaluating unit is associated with a second factor which is determined by the total sums of the SAD value of the input pixels.

9. The system of claim 6, wherein the weighting factor value of the weight-evaluating unit is associated with a third factor which is associated with the minimum SAD value of the input pixels.

10. The system of claim 6, wherein the weighting factor value of the weight-evaluating unit is associated with a fourth factor which is used to identify whether the minimum SAD value along the minimum-angle direction has secondary smallest SAD value relative to the minimum SAD value.

11. The system of claim 1, wherein the image blending device further comprises:
   a first scaling/sharpness module, for implementing a directional scaling and sharpness step based on one of the vertical direction and the horizontal direction; and
   a second scaling/sharpness module, for implementing the directional scaling and sharpness step based on one of the minimum-angle direction except the vertical direction and the horizontal direction.

12. The system of claim 1, wherein the image blending device further comprises a noise filter.

13. The system of claim 12, wherein the noise filter further comprises a comb factor which is subtracted from the weighting factor to decrease the amount of the weighting value, and when the comb factor is increased, the interpolation result of the input pixels tends to the cross-angle direction.

14. An image processing method, comprising the steps of:
(a) receiving a plurality of input pixels;
(b) calculating a vertical frequency level of the input pixels along a vertical direction and a horizontal frequency level of the input pixels along a horizontal direction by a global frequency detecting unit;
(c) adjusting a first threshold and a second threshold based on the vertical frequency level and the horizontal frequency level by a threshold-adjusting device;
(d) calculating a set of gradient brightness levels of a portion of the input pixels along a set of directions, respectively by a gradient-calculating summation unit;
(e) comparing the set of brightness gradient levels to determine that a cross-angle direction is along either the horizontal or vertical direction for generating a first pattern using the first threshold;
(f) comparing the set of brightness gradient levels to determine that a minimum-angle direction is along one of the set of directions for generating a second pattern using the second threshold; and
(g) blending the first pattern associated with the first threshold from the global frequency detecting unit into the second pattern associated with the second threshold based on a weighting factor value.

15. The method of claim 14, after the step (b), further comprising the steps of:
computing the vertical frequency level of the input pixels along the vertical direction by a vertical frequency detecting unit; and
computing the horizontal frequency level of the input pixels along the horizontal direction by a horizontal frequency detecting unit.

16. The method of claim 15, wherein the minimum-angle direction is a direction of a minimum brightness change associated with the input pixels.

17. The method of claim 14, during the step (e), further comprising the step of: (e1) determining the first pattern along one of the vertical direction and the horizontal direction based on the first threshold by a cross-angle determination module.

18. The method of claim 17, during the step (e), further comprising the step of: (e2) determining the second pattern along one of the set of directions based on the second threshold except the vertical direction and the horizontal direction by a minimum-angle determination module.

19. The method of claim 14, wherein the weighting factor value of the weight-evaluating unit is associated with a first factor which is determined by the sum of the absolute difference (SAD) of the input pixels along the cross-angle direction and minimum-angle direction respectively.

20. The method of claim 14, wherein the weighting factor value of the weight-evaluating unit is associated with a second factor which is determined by the total sums of the SAD value of the input pixels.

21. The method of claim 14, wherein the weighting factor value of the weight-evaluating unit is associated with a third factor which is associated with the minimum SAD value of the input pixels.

22. The method of claim 14, wherein the weighting factor value of the weight-evaluating unit is associated with a fourth factor which is used to identify whether the minimum SAD value along the minimum-angle direction has secondary smallest SAD value relative to the minimum SAD value.

23. The method of claim 14, after the step (f), further comprising the steps of:
(f1) implementing a directional scaling and sharpness step based on one of the vertical direction and the horizontal direction by a first scaling/sharpness module; and
(f2) implementing the directional scaling and sharpness step based on one of the minimum-angle direction except the vertical direction and the horizontal direction by a second scaling/sharpness module.

24. The method of claim 14, further comprising a comb factor which is subtracted from the weighting factor to decrease the amount of the weighting value.

25. The method of claim 24, wherein when the comb factor is increased, the interpolation result of the input pixels tends to the cross-angle direction.

* * * * *